US009109654B2

(12) United States Patent
Hiemenz et al.

(10) Patent No.: US 9,109,654 B2
(45) Date of Patent: Aug. 18, 2015

(54) FAILSAFE MAGNETORHEOLOGICAL (MR) ENERGY ABSORBER

(71) Applicants: Gregory J. Hiemenz, Silver Spring, MD (US); Norman M. Wereley, Potomac, MD (US)

(72) Inventors: Gregory J. Hiemenz, Silver Spring, MD (US); Norman M. Wereley, Potomac, MD (US)

(73) Assignees: Inno Vital Systems, Inc., Calverton, MD (US); University of Maryland, College Park, College Park, MD (US)

( * ) Notice: Subject to any disclaimer, the term of this patent is extended or adjusted under 35 U.S.C. 154(b) by 71 days.

(21) Appl. No.: 13/916,227

(22) Filed: Jun. 12, 2013

(65) Prior Publication Data

US 2014/0152066 A1    Jun. 5, 2014

Related U.S. Application Data

(60) Provisional application No. 61/658,463, filed on Jun. 12, 2012.

(51) Int. Cl.
*F16F 9/53* (2006.01)
*B60N 2/50* (2006.01)
*B60N 2/52* (2006.01)
*F16F 9/12* (2006.01)

(52) U.S. Cl.
CPC ............... *F16F 9/535* (2013.01); *B60N 2/501* (2013.01); *B60N 2/522* (2013.01); *F16F 9/12* (2013.01)

(58) Field of Classification Search
CPC ........... F16F 9/535; F16F 9/537; F16F 15/03; F16F 7/082; F16D 57/002; B60N 2/06
USPC ................. 188/266, 267.2, 267; 297/344.1
See application file for complete search history.

(56) References Cited

U.S. PATENT DOCUMENTS

| 5,277,281 | A   |   | 1/1994  | Carlson et al.           |
|-----------|-----|---|---------|--------------------------|
| 6,095,295 | A   | * | 8/2000  | Park et al. ..... 188/267.2 |
| 6,186,290 | B1  | * | 2/2001  | Carlson ............ 188/164 |
| 6,202,806 | B1  | * | 3/2001  | Sandrin et al. ..... 188/267.1 |
| 6,279,700 | B1  |   | 8/2001  | Lisenkser et al.         |
| 6,311,810 | B1  |   | 11/2001 | Hopkins et al.           |
| 6,481,546 | B2  |   | 11/2002 | Oliver et al.            |
| 6,694,856 | B1  |   | 2/2004  | Chen et al.              |

(Continued)

FOREIGN PATENT DOCUMENTS

WO    WO 2010116415 A1 * 10/2010

OTHER PUBLICATIONS

English transilation of WO-2010-116415 A1, Inventor Inaba, Publication Date—Oct. 14, 2010*

(Continued)

*Primary Examiner* — Anna Momper
*Assistant Examiner* — San Aung
(74) *Attorney, Agent, or Firm* — Ober, Kaler, Grimes & Shriver; Royal W. Craig

(57) ABSTRACT

A compact and failsafe magnetorheological energy absorber design including both a light weight piston (LWP) embodiment in which linear motion is subjected to a linear damping force, and a light weight rotary vane (LWRV) embodiment in which linear motion is converted into rotary motion and is subjected to a rotary damping force. Both embodiments allow increased damper stroke within a compact mechanical profile. A new lightweight Magnetorheological energy attenuation system (LMEAS) for a vehicle seat is also disclosed using the new LMRW MREA.

24 Claims, 8 Drawing Sheets

(56) References Cited

U.S. PATENT DOCUMENTS

| | | |
|---|---|---|
| 6,953,108 B2 | 10/2005 | Anderfaas et al. |
| 6,983,832 B2 | 1/2006 | Namuduri et al. |
| 7,198,140 B2 * | 4/2007 | Jolly et al. .................... 188/267 |
| 2003/0070892 A1 * | 4/2003 | Iyengar et al. ............. 188/267.2 |
| 2007/0023244 A1 * | 2/2007 | Carlson et al. ................ 188/267 |
| 2008/0041677 A1 * | 2/2008 | Namuduri .................. 188/267.2 |
| 2008/0156602 A1 * | 7/2008 | Hiemenz et al. ........... 188/267.1 |
| 2009/0133976 A1 * | 5/2009 | Bose et al. ................. 188/267.2 |
| 2010/0231069 A1 * | 9/2010 | Liao et al. ....................... 310/77 |
| 2011/0204685 A1 * | 8/2011 | Dock ......................... 297/216.1 |

OTHER PUBLICATIONS

Hiemenz, G.J., Choi, Y.T. and Wereley, N.M., "Semi-Active Control of a Vertical Stroking Helicopter Crew Seat for Enhanced Crashworthiness", Journal of Aircraft, AIAA, vol. 44, No. 3, May-Jun. 2007, pp. 1031-1034.

Harrer, K. L., Yniguez, D., Majar, M., Ellenbecker, D., Estrada, N., and Geiger, M., "Whole Body Vibration Exposure for MH-60S Pilots", Proceedings of the Forty Third Annual SAFE Association Symposium, Salt Lake City, Utah, Oct. 24-26, 2005, pp. 303-314.

* cited by examiner

FAILSAFE MAGNETORHEOLOGICAL (MR) ENERGY ABSORBER

CROSS-REFERENCE TO RELATED APPLICATION(S)

The present application derives priority from U.S. Provisional Patent Application 61/658,463 filed Jun. 12, 2012.

BACKGROUND OF THE INVENTION

1. Field of the Invention

The present invention relates generally to energy absorbers and energy absorption systems, and more particularly, to a failsafe magnetorheological damper for shock and vibration energy absorption systems employing a combination of permanent or switchable magnets with electromagnetic coils.

2. Description of Prior Art

The primary function of a shock and vibration protection system is to minimize the potential for equipment damage and/or personnel injury during shock and vibration loading. Such systems are important for vehicular applications, including aircraft, ground vehicles, marine vehicles, etc. Severe shock events may include harsh vertical or crash landings of aircraft, under body explosions of military ground vehicles, horizontal collisions of automobiles, and severe wave-to-hull impact of high speed watercraft. Lower amplitude shock and vibration tend to result from normal operation of such vehicles, including aircraft air loads or rotor loads, ground vehicles traversing rough terrain, etc. The severity of equipment damage and/or personnel injuries can be considerably minimized if the vehicles are equipped with shock and vibration protection systems.

Most current shock and vibration protection systems are passive, in that they cannot automatically adapt their energy absorption as a function of payload weight or as a function of real-time environmental measurements such as shock level, impact velocity, vibration levels, etc. Moreover, some energy absorbers are essentially rigid and do not stroke until the load reaches a tuned threshold. Because of this, these systems provide no isolation of vibration. This motivates the development of a shock and vibration protection system that utilizes an electronically adjustable adaptive energy absorber that can provide adaptive energy absorption for enhanced crashworthiness as well as vibration mitigation.

Magnetorheological (MR) technology is particularly attractive for shock and vibration protection systems as an MR fluid based device can offer an innovative way to achieve what is effectively a continuously adjustable energy absorber, in combination with a real-time feedback controller, can automatically adapt to payload weight and respond to changing excitation levels. With its ability to smoothly adjust its load-stroke profile, MR energy absorbers can provide the optimum combination of short stroking distance and minimum loading while automatically adjusting for the payload weight and load level. Furthermore, MR energy absorbers offer the unique ability to use the same system for vibration isolation.

For example, adaptive energy attenuation (EA) devices for helicopter seats can provide enhanced crash safety by adjusting their stroking load in response to both varying occupant weight and impact severity. This makes it possible to minimize shock load induced injury across a range of occupants and crash severities. Hiemenz, G. J., Choi, Y. T. and Wereley, N. M., "*Semi-Active Control of a Vertical Stroking Helicopter Crew Seat for Enhanced Crashworthiness*", Journal of Aircraft, AIAA, Vol. 4, No. 3, May-June 2007, pp. 1031-1034. Even during normal operation whole body vibration (WBV) has become a key concern due to associated chronic injuries, fatigue, and loss of situational awareness. Harrer, K. L., Yniguez, D., Majar, M., Ellenbecker, D., Estrada, N., and Geiger, M., "*Whole Body Vibration Exposure for MH-60S Pilots*", Proceedings of the Forty Third Annual SAFE Association Symposium, Salt Lake City, Utah, Oct. 24-26, 2005, pp. 303-314.

MR energy absorbers offer a promising technology to address both adaptive crash attenuation and vibration isolation. By modulating the MREA force in real-time based upon sensor inputs (i.e., sink rate, piston velocity, stroke), these systems minimize the load transmitted to the occupant by safely utilizing the full available stroke of the seat. By modulating the MREA force in real-time based upon sensor inputs (i.e., sink rate, piston velocity, stroke) these systems are able to attenuate crash loads for a wide range of occupant weights and crash severity. MR energy absorbers can provide the additional benefit of occupant protection against vibration. Many MR energy absorbers for shock and vibration isolation mounts have been disclosed such that the damping level can be controlled in feedback by applying a magnetic field (U.S. Pat. No. 5,277,281 to J. D. Carlson et al., U.S. Pat. No. 6,279,700 to H. Lisenkser et al., U.S. Pat. No. 6,311,810 to P. N. Hopkins et al., U.S. Pat. No. 6,694,856 to P. C. Chen and N. M. Wereley, U.S. Pat. No. 6,953,108 to E. N. Ederfass and B. Banks, U.S. Pat. No. 6,481,546 to M. L. Oliver and W. C. Kruckemeyer, and U.S. Pat. No. 6,983,832 to C. S. Namuduri et al). See also, U.S. Pat. No. 6,694,856 issued Feb. 24, 2004 to Chen et al. which includes test data obtained from a COTS Lord Rheonetics® MR damper including force vs. piston behavior.

However, a key challenge in vehicular applications involving MR energy absorbers, such as helicopter seats, is the device weight and size. MR energy absorbers must have a large controllable range, stroke, and bandwidth to provide adaptation to payload weight, shock energy, speed, and required energy absorption. The size and weight of conventional linear-piston MR damper designs for such applications can make their use prohibitive. Hence, the development of more compact, lighter weight MR devices with the capability to adapt to shock and vibration conditions is of great interest.

Another key challenge is the requirement for fail-safe performance should vehicle power not be available during a crash. The concern of fail-safe performance arises because MREAs are typically in their low-force condition when electrical current is not supplied. If there is a loss in power, the device will operate in its off-state (passive) condition and will passively absorb energy, but will provide little or no crash protection.

The present invention provides a failsafe Adaptive MR Energy Absorber (FAMEA) for helicopter and other vehicle seats that is lightweight and compact.

SUMMARY OF THE INVENTION

Disclosed herein is a compact and failsafe magnetorheological energy absorber design including both a light weight piston (LWP) embodiment in which linear motion is subjected to a rotary damping force, and a light weight rotary vane (LWRV) embodiment in which linear motion is converted into rotary motion and is subjected to a rotary damping force. Both embodiments allow increased damper stroke within a compact mechanical profile. A new lightweight Magnetorheological energy attenuation system (LMEAS) for a vehicle seat is also disclosed using the new LMRW MREA mentioned above.

In the LWP MREA a cup-shaped rotor is mounted on a shaft inside a hollow MR-fluid-filled housing, and is free to rotate on the shaft inside the housing. A stationery stator body occupies the center of the housing inside the cup-shaped rotor. The rotor shears the MR fluid, and the shear resistance of the MR fluid is controlled by changing the rheological properties of the fluid with the presence of a magnetic field, allowing control over the reaction force on the rotor, which in turn causes a reaction torque-moment on the shaft. The torque-moment serves as a damping force and can be further converted into a linear damping force with a rotary-to-linear motion converting mechanism. In one embodiment, the magnetic field is created by a combination of permanent magnets in the stator body which create a baseline magnetic bias, plus electromagnetic coils mounted on the stator body which create an offset magnetic bias that boosts or reduces the baseline magnetic field as required depending on the polarity of the current in the electromagnetic coil. By using an offset electromagnetic field to offset a baseline permanent magnetic field the stroking load of the LWR MREA can be both increased and decreased from the baseline level in order to optimize the device for handling vibration and lower energy impacts, and also to provide a failsafe operating condition where no power is supplied. Further, due to the presence of a baseline magnetic bias that provides a majority of the energy attenuation requirement, additional weight savings can be achieved (due to a smaller electromagnetic coil and bobbin design), and the device can attenuate crash loads during loss of power.

In another exemplary embodiment, the baseline magnetic field is created by switchable magnets, a class of magnets that can be magnetized to a specified field and demagnetized as required.

In still another embodiment, a light weight piston-type (LWP) magnetorheological energy absorber (MREA) is disclosed that incorporates the same inventive concept.

Other features, advantages and characteristics of the present invention will become apparent after the following detailed description.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

Generally, the invention disclosed herein is a novel compact and failsafe magnetorheological energy absorber design including both a light weight piston (LWP) embodiment in which linear motion is subjected to a rotary damping force, and a light weigh rotary vane (LWRV) embodiment in which linear motion is converted into rotary motion and is subjected to a rotary damping force. Both embodiments allow increased damper stroke within a compact mechanical profile. A new lightweight Magnetorheological energy attenuation system (LMEAS) for a vehicle seat is also disclosed using the new LMRW MREA mentioned above.

Figure 1:
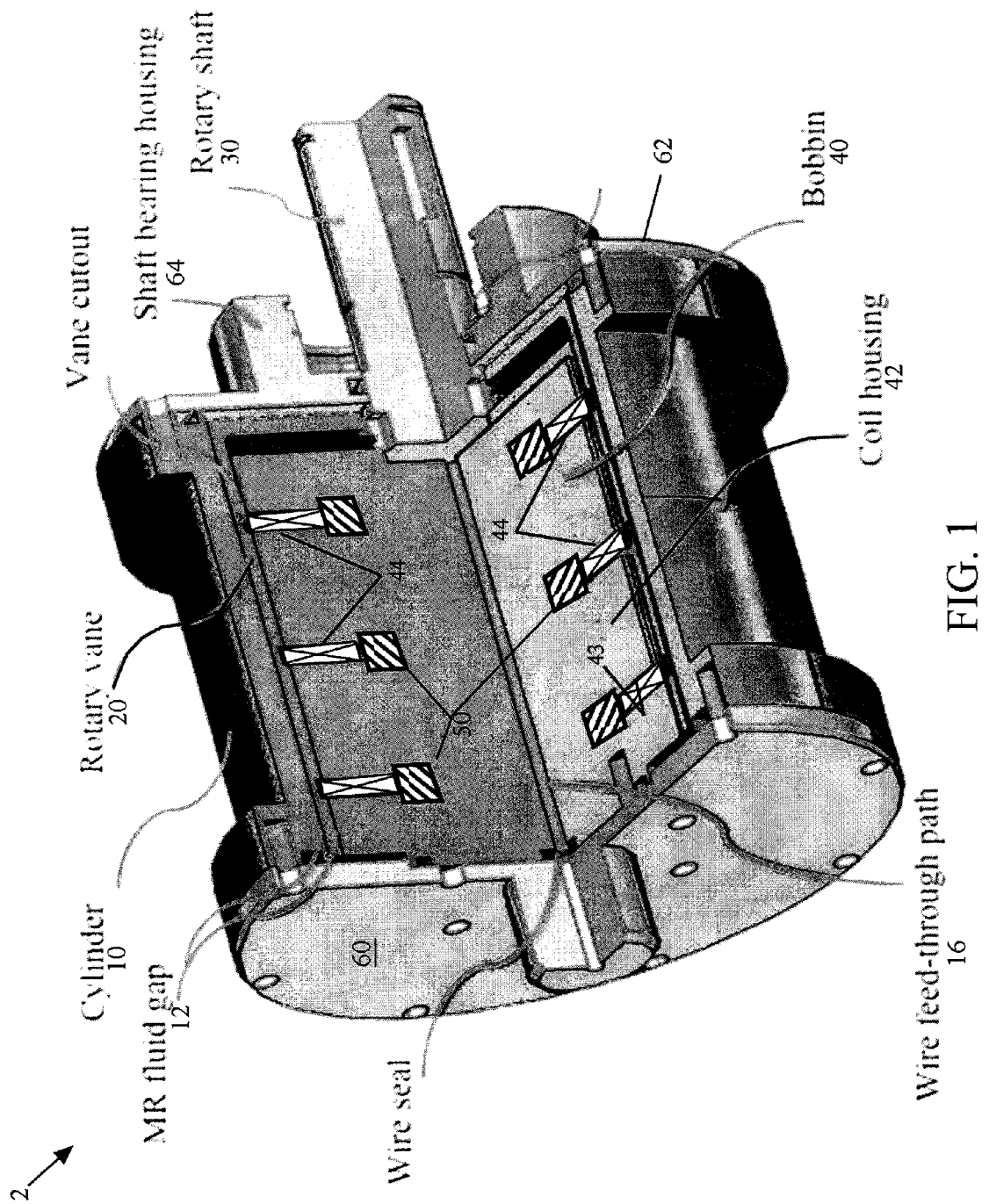
FIG. 1 is a perspective view of a first embodiment of the present invention implemented as a light weigh rotary vane (LWRV) magnetorheological energy absorber (MREA).

A first embodiment is a lightweight rotary vane (LWRV) magnetorheological energy absorber (MREA) as depicted in FIG. 1. In this embodiment, the LWRV MREA 2 comprises a cylindrical damper housing 10 defining an internal cylindrical volume containing MR fluid. Damper housing 10 is capped by opposing end plates including a lower coil bobbin plate 60 and upper bearing plate 62. A stationery coil bobbin 40 is affixed to coil bobbin plate 62 and resides within the internal cylindrical volume of damper housing 10. Coil bobbin 40 provides a stator structure for electromagnetic coils 44, such coils (see FIG. 1, not shown in FIG. 2) being seated within annular coil housing grooves 43 in coil housing 42. Cup-shaped rotary vane 20 fits overtop the coil bobbin 40 and occupies the fluid gap between the coil bobbin 40 and inner surface of damper housing 10. The cup-shaped rotary vane 20 is connected to a rotary shaft 30 that is journaled through the coil bobbin plate 60 and bearing plate 62, both of which include rod seals (not shown) and one or both of which may include shaft bearings (in the illustrated embodiment bearing plate 62 is shown with a shaft bearing housing 64). One end of the shaft 30 is extended out of the upper bearing plate 62 and shaft bearing housing 64 and is connected directly to an external rotating operator, or to some external linear-to-rotary force translating device (e.g., a cable reel) which is in turn connected to an operator. As shaft 30 rotates due to applied torque, the MR fluid in the double-faced gap between the rotary vane 20 and the wall of cylindrical damper housing 10, and the rotary vane 20 and coil bobbin 40, respectively, is sheared and MR fluid flow is induced. The shear resistance of the MR fluid is dependent on the magnetic field, and so the output torque of the rotary vane MREA 2 can be controlled by the magnetic field.

In accordance with the embodiment shown in FIG. 1, a plurality of permanent magnets 50 are embedded within the coil bobbin 40. The permanent magnets 50 create a permanent magnetic field to provide a baseline level of performance and a failsafe operating condition where no power is supplied to the LWRV MREA 2.

One skilled in the art should understand that permanent magnets 50 may be replaced by switchable magnets, a class of magnets that can be magnetized to a specified field and demagnetized as required, such as AlNiCo 500 (Aluminium Al, Nickel Ni, Cobalt Co), electrically switchable permanent magnets.

In either case, the permanent (or switchable) magnets 50 and bobbin 40 form a magnetic circuit, the permanent (or switchable) magnets 50 generating a baseline magnetic field while the coils of bobbin 40 generate an electromagnetic field that boosts or reduces the baseline magnetic field as required depending on the polarity of the current in the electromagnetic coils 44. In doing this, the stroking load of shaft 30 can be both increased AND decreased from the baseline level in order to handle vibration and lower energy impacts when the coil is polarized to negate the effect of the permanent/switchable magnets 50 and handle higher energy impact energies when polarized to increase its effect. Further, due to the presence of a baseline magnetic bias that provides a majority of the energy attenuation requirement, additional weight savings can be achieved due to a smaller electromagnetic coil 44 and bobbin 40 design, which accounts for a significant portion of weight in prior art designs.

Figure 2:
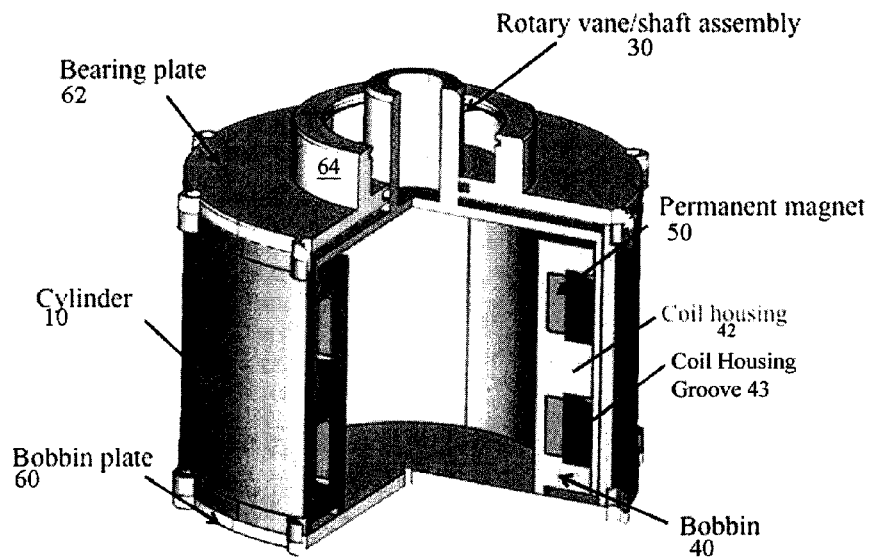
FIG. 2 is a perspective cut-away view of the LWRV MREA 2 of FIG. 1.

FIG. 2 is a perspective cut-away view of the LWRV MREA 2 illustrating the permanent (or switchable) magnets 50 in bobbin 40 which preferably comprise a plurality of permanent magnetic rings, or partial rings aligned end-to-end to form rings. The annular coil housing grooves 43 of bobbin 40 may be extended inward to form seating channels for permanent magnet rings 50. The MR fluid constitutes a closed-loop magnetic field path perpendicular to the flow direction of the MR fluid. These permanent magnets 50 will generate a constant baseline (failsafe) magnetic field that can be strengthened or weakened as needed using a relatively smaller electromagnetic coil design. In the embodiment of FIG. 2 a two stage coil design is implemented, where each stage comprises a co-axially located permanent magnet ring 50 circumscribed by an electromagnetic coil 44 in coil housings 42. Again, the permanent magnets 50 are designed to provide the baseline level magnetic field, while the coils are designed to boost or lower (up to zero field) the magnetic field from the permanent magnets 50.

Figure 3:
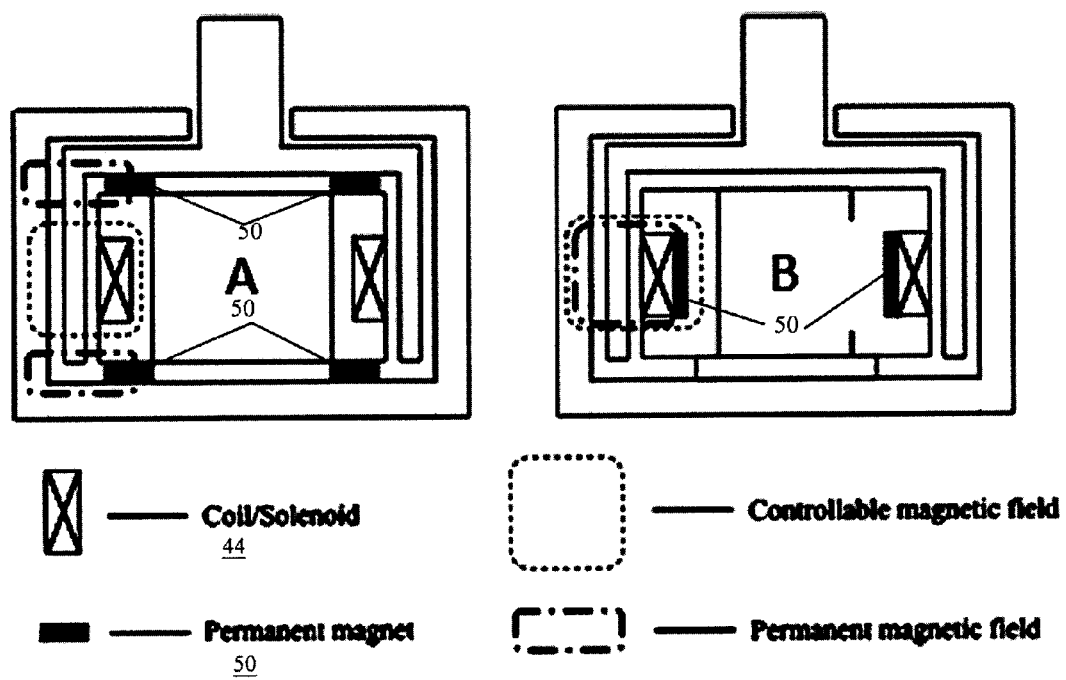
FIG. 3 is a diagram illustrating two alternative placements of the permanent magnets 50 and magnetic flux paths.

As seen in the diagram of FIG. 3, the placement of the permanent magnets 50 may vary. The configuration at A is a stacked configuration in which a pair of permanent magnets 50 are placed above and below the electromagnetic coils 44, while the configuration at B is a co-axial configuration in which a single magnetic ring 50 is placed co-axially with the electromagnetic coils 44.

In operation, linear motion from a shock/crash event is converted into a rotation and then further transferred to the center shaft 30 and rotary vane 20. The rotation of the rotary vane 20 in the cylindrical volume shears MR fluid. The flow resistance of the MR fluid yields a torsional moment applied to the rotary vane 20, and a rotary stroking force applied to shaft 30. The stroking force can be regulated as the current applied to the bobbin 40 coils is varied since the magnetic field controls the viscosity of the MR fluid which in turn controls the shear resistance to rotation of the rotary vane 20. Since the apparent viscosity of the MR fluid is a monotonic increasing function of the magnetic field, the resultant stroking force can increase as the applied magnetic field increases.

Figure 4:
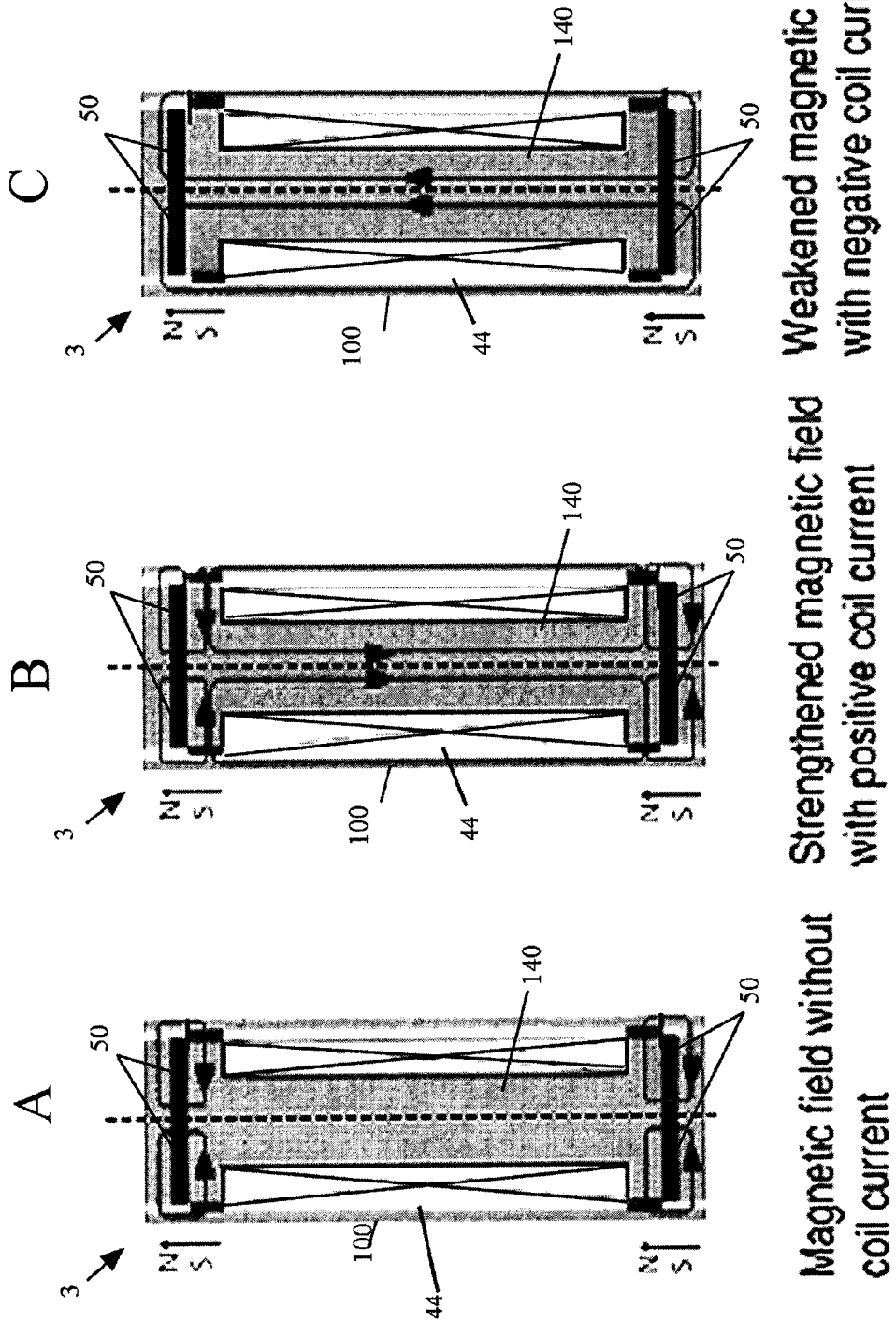
FIG. 4 illustrates a second embodiment of the invention implemented as a light weigh piston (LWP) magnetorheological energy absorber (MREA), including schematics of the magnetic flux in different operation modes.

FIG. 4 illustrates a second embodiment 3 of the invention implemented as a light weigh piston (LWP) magnetorheological energy absorber (MREA) 3, the three views (A-C) illustrating the different operation modes. As above a piston housing 100 defines a sealed interior filled with magnetorheological fluid. However, rather than a rotary vane, a piston body 140 is mounted inside the housing for reciprocation within the magnetorheological fluid. At least one permanent magnet 50 is attached to the piston body 140 for generating a baseline magnetic field. In addition, the piston body 140 is wrapped with electromagnetic coils 44 for generating the offset magnetic field in the magnetorheological fluid (shown at A in arrows). As above, the stroking force of the piston body 140 can be regulated as the current applied to the coils 44 is varied since the magnetic field controls the viscosity of the MR fluid which in turn controls the linear piston actuation of the piston body 140.

In the power-off condition (A), the permanent magnets 50 generate a magnetic field, which creates an MR effect that provides the failsafe damping. When current is applied to the magnetic coils (B-C), the resulting magnetic field, depending on the polarity of the applied current in the coil 44, will strengthen (as at B) or weaken (as at C) the magnetic field of the permanent magnets 50 in the active MR gap as required, thus respectively increasing or decreasing the damping force.

Figure 5:
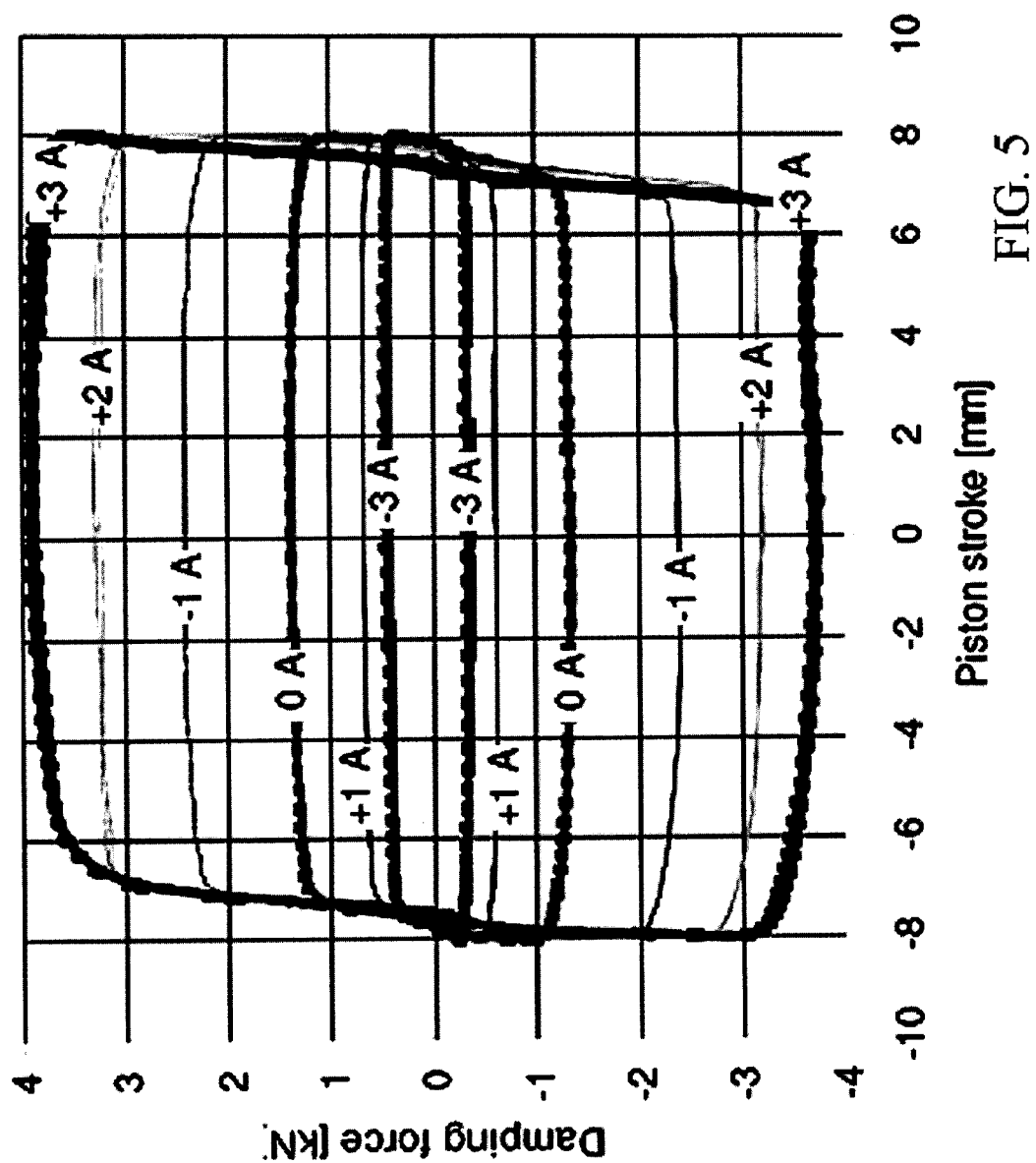
FIG. 5 is a graph of the relative damping force using a LWP MREA with permanent magnets using low frequency sinusoidal type tests (up to 5 Hz) and low piston strokes (up to 0.32 in) for varying applied currents at 1 Hz.

FIG. 5 is a graph of the relative damping force using the piston-type MREA of FIG. 4 with permanent magnets 50. Low frequency sinusoidal type tests (up to 5 Hz) and low piston strokes (up to 0.32 in) were conducted for varying applied currents. Without any additional magnetic field from the magnetic coils, indicating a powerless damping state, a significant damping force was still attained. The lowest damping force was recorded at an applied current of negative 3 A, whereas the maximum force was recorded at an applied current of positive 3 A. These results constitute the attractive failsafe behavior that an MR damper with a permanent magnet 50 exhibits.

Figure 6:
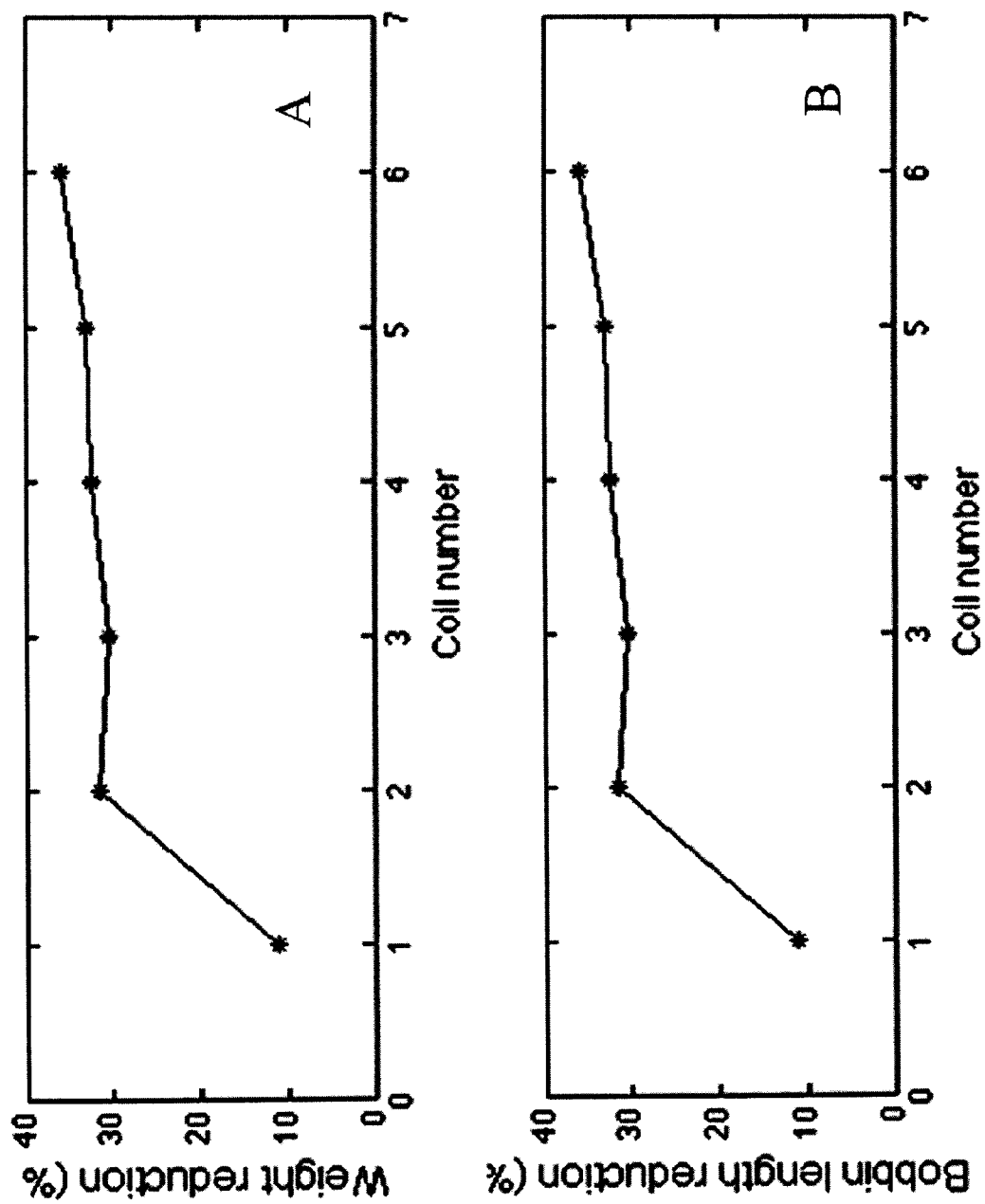
FIG. 6 is a graphical illustration of the expected weight and size reduction as compared to prior art MREAs with increasing number of coil stages based on electromagnetic and hydrodynamic analyses.

FIG. 6 is a graphical illustration of the expected weight and size reduction as compared to prior art MREAs with increasing number of coil stages based on electromagnetic and hydrodynamic analyses. An appropriately sized LWP MREA 3 for enhanced crash safety would be over 30% lighter and 30% shorter (for the same diameter) than existing designs. Compared to a conventional linear stroke MREA, that amounts to at least a 90% reduction in weight. An appropriately sized LWRV MREA 2 can be reduced even further in weight by appropriate selection of linear-to-rotary conversion mechanisms.

Figure 7:
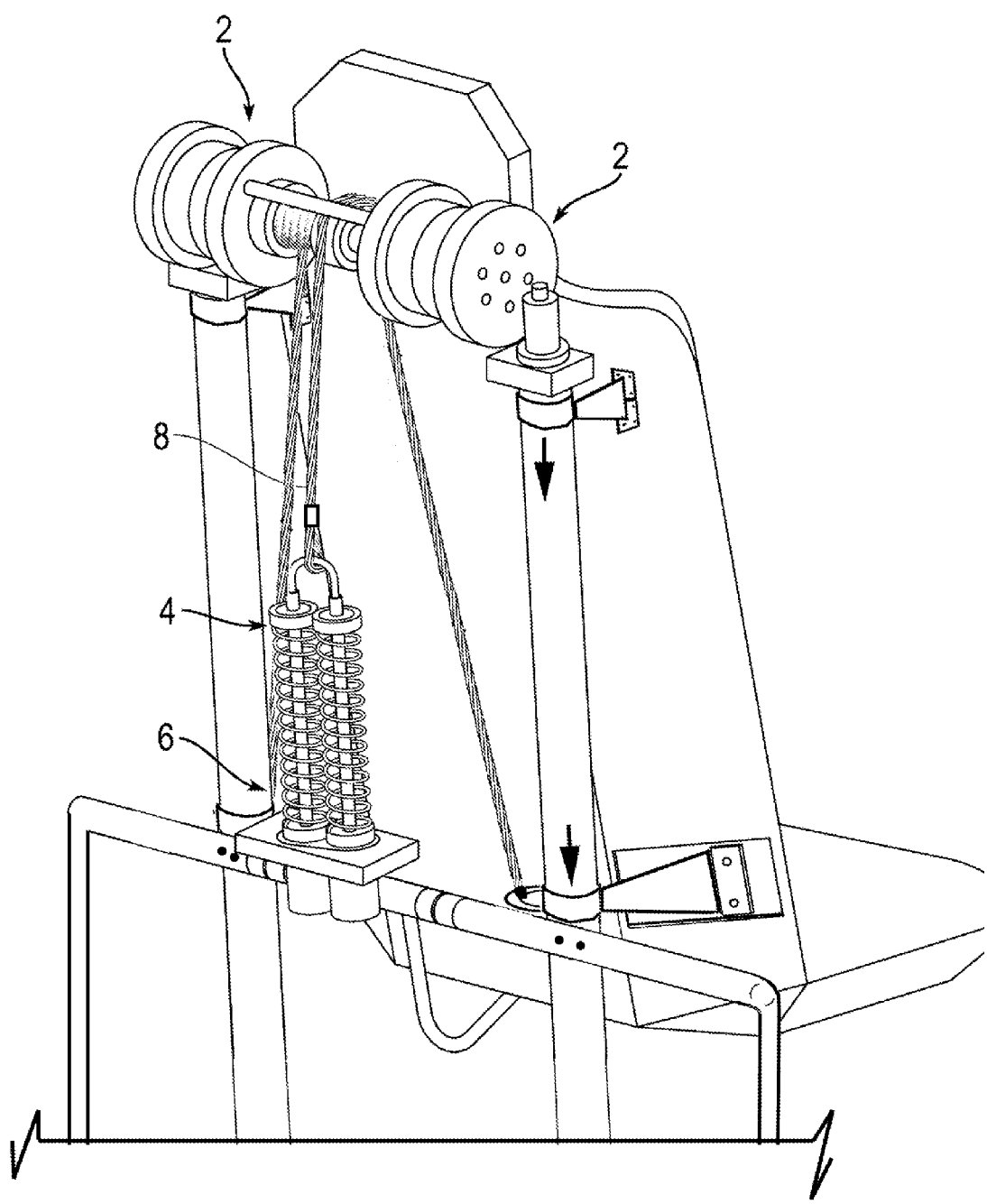
FIG. 7 illustrates an exemplary new lightweight magnetorheological energy attenuation system (LMEAS) for a vehicle seat that uses the LMRW MREA of FIGS. 1-3 above.
Figure 8:
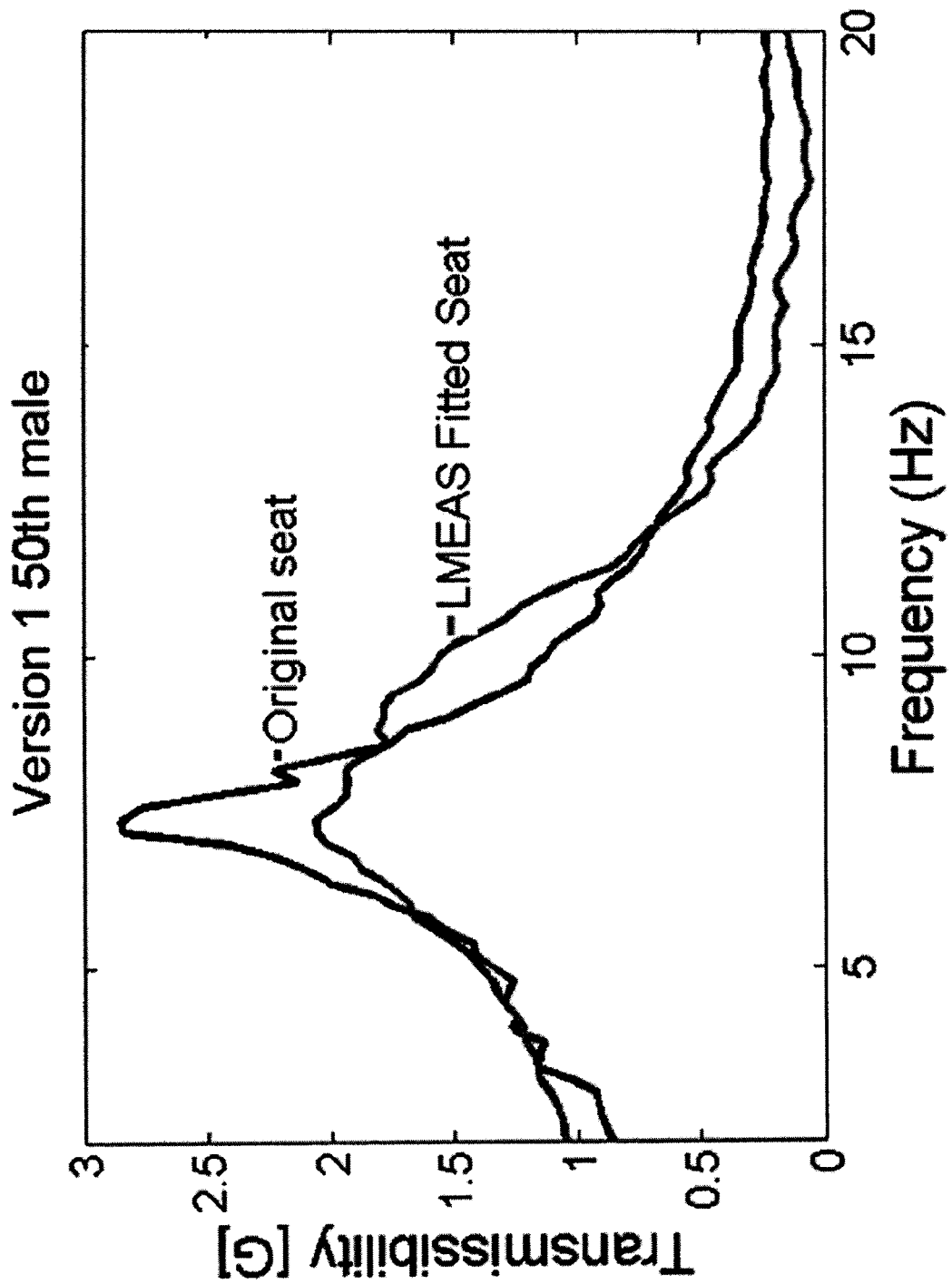
FIG. 8 is a graphical illustration of typical transmissibility plots from vibration tests for the 50th male aviator.
Figure 9:
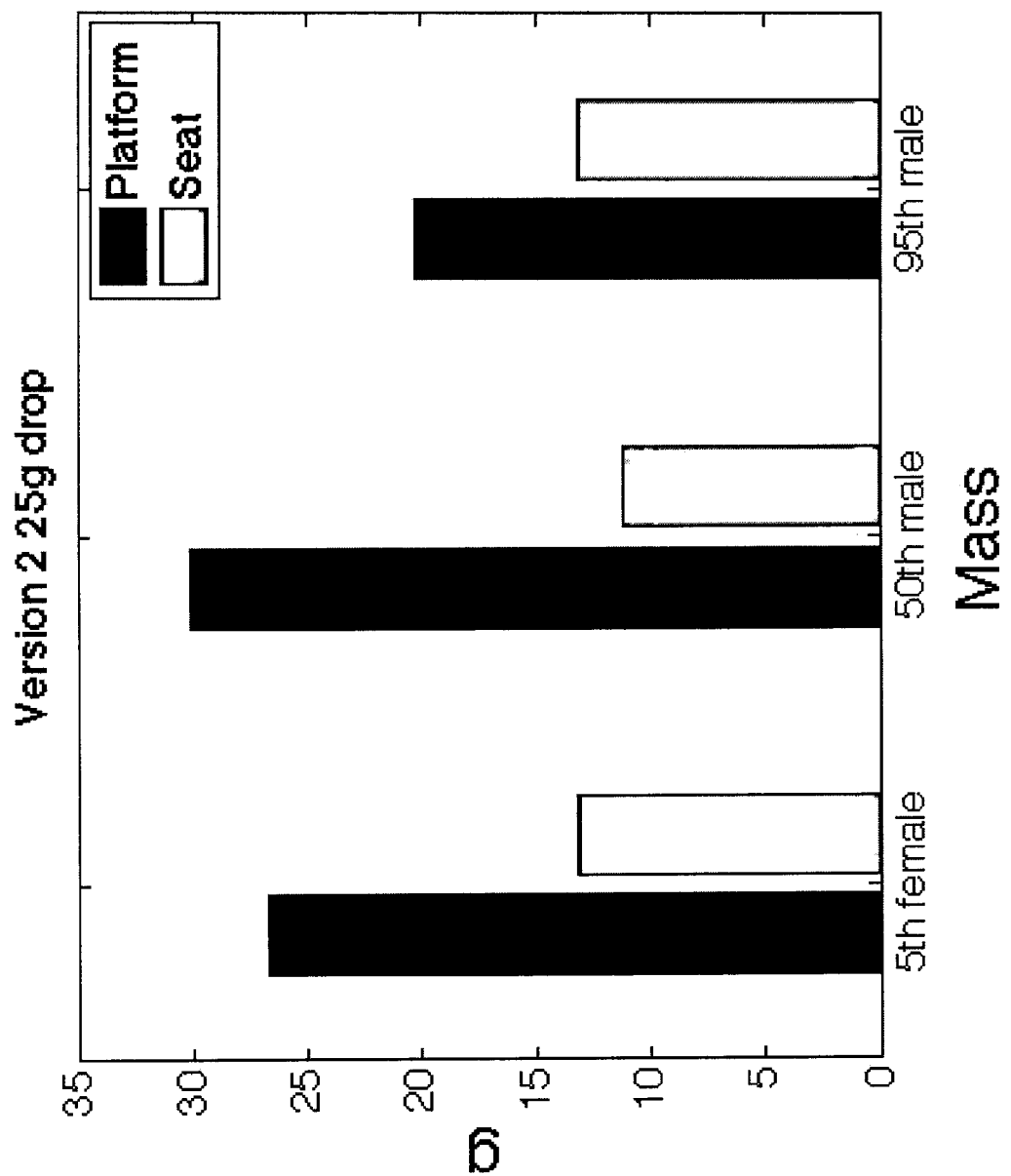
FIG. 9 shows the reduction in peak acceleration for medium sink rate drop tests.

FIG. 7 illustrates an exemplary system integration of two LWRV MREAs 2 in semi-active magnetorheological seat suspension for enhanced crashworthiness and vibration isolation. This LMEAS system comprises three key assemblies: the dual LWRV MREA 2 assembly, a spring assembly 4, and the seat yoke assembly (the latter being an existing component of the existing seat). There are two LWRV MREAs 2 mounted in "shoulder" positions behind the seat, one at the top of each seat frame post. The two rotary shafts 30 face inwards and are connected by a central shaft assembly. Wound around this shaft is a break-away spring cable 8, one end of cable 8 being attached to the spring assembly 4, and the other end of cable 8 being attached to the seat height adjuster yoke on the seat. This reinforces the existing seat yoke structure and effectively suspends the seat from the LWRV MREA 2 assembly and spring cables 8. The spring assembly 4 is clamped to the existing center crossbar of the seat and maintains tension in the system, maintaining ride height and providing recoil force during normal operation. A single integrated control electronics unit 8 provides stand-alone control or alternatively interfaces with an active crash protection system (not shown). The control electronics unit 8 is preferably a multi-mode controller running software comprised of a semi-active vibration control mode and an adaptive shock control mode for vibration isolation and enhanced crash safety, respectively. The LMEAS integrated seat of FIG. 7 has been tested for vibration isolation and low to medium speed sink rate drops for occupant representative weights varying from 5th percentile female to 95th percentile male aviator using a vertical axis shock and vibration test stand. Typical transmissibility plots from vibration tests for the 50th male aviator are shown in FIG. 8. The plots show that, compared to a commensurate but unmodified seat, the LMEAS integrated seat of FIG. 7 showed a tuned resonance suppression at lower frequencies (1 P or rotor rpm), while it also exhibited an improved vibration isolation at high frequencies. More than 50% reduction at the dominant vibration frequency of the rotor (4 P, 17 Hz) was experimentally demonstrated. These two attributes are unachievable with a passive system and illustrate the superior vibration performance of the present invention. In order to evaluate the performance of the LMEAS integrated seat under impact conditions, low to medium sink rate drop tests were performed. These impact tests were conducted for the 5th percentile female, 50th male, and 95th male occupant weights with an average peak deceleration of 12 and 25 G's, corresponding to impact velocities of 10 ft/s and 20 ft/s, respectively. A combination of steel and/or sand bag weights were attached to the seat to simulate the mass for 5th percentile female (113 lb), 50th percentile male (180 lb), and 95th percentile male (260 lb) occupants with an additional 40 lb of equipment for 50th and 95th percentile male occupants. FIG. 9 shows the reduction in peak acceleration for medium sink rate drop tests. Low sink rate drop show similar trend. These results show that the LMEAS integrated seat of FIG. 7 was able to adapt to varying occupant weights and sink rates, and minimize the load transmitted to the occupant by safely utilizing the available stroke of the seat. The passive OEM EAs would have barely stroked under these conditions and yielded much higher acceleration levels at the seat.

It should now be apparent that the above-described invention provides an optimized LWRV MREA 2 and LMP MREA 3 both with failsafe operation, and baseline and adaptive force levels to handle varying crash scenarios as well as vibration isolation while further reducing device weight. The failsafe operation ensures functionality at baseline levels of performance that protects the statistically mean male aviator at the current design requirement (MIL-S-58095A). In an event of reduced or loss of power during a mission, the LWRV MREA 2 and/or LMP MREA 3 will continue to passively absorb energy as a passive hydraulic damper, and provide crash protection similar to passive energy absorbers.

One skilled in the art should readily understand that there are other suitable damper structures, as well as mechanical means for conversion of linear motion due to a shock/crash event into rotation (a cable reel wheel and cable, or rack and pinion gear, shaft and ballscrew, etc.).

In all the above-embodiments, the Key benefits of the proposed technology are:
1. A baseline energy absorption for failsafe conditions with no or reduced power
2. Automatic adaptability to varying shock levels, from severe crash events to harsh landings
3. Automatic adaptability to varying occupant body weight—providing equal protection for the entire crew population, from the smallest female to the largest male
4. Isolation of lower amplitude vibrations and reduction of whole body vibration (WBV) during normal operation
5. Low cost, further reduced weight, highly reliable, retrofit-capable mechanical system.

Therefore, having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed is:

1. A rotary vane magnetorheological energy absorber (MREA), comprising:
    a housing defining a sealed interior;
    magnetorheological fluid in the interior of said housing;
    a rotor mounted on a shaft inside said housing in exposure to said magnetorheological fluid;
    a stator body mounted stationary relative to said housing;
    at least one permanent magnet attached to said stator body for generating a constant baseline magnetic field in said magnetorheological fluid;
    electromagnetic coils wound about said stator body for generating an offset magnetic field in said magnetorheological fluid;
    a damping characteristic of the magnetorheological fluid on said rotor comprising a function of said constant baseline electromagnetic field and said variable offset electromagnetic field.

2. The rotary vane MREA of claim 1, further comprising a control system including non-transitory computer memory, and a programmable controller programmed with control software comprising computer instructions stored on the non-transitory computer memory for adjusting current in said electromagnetic coils to selectively increase or decrease said offset magnetic field.

3. The rotary vane MREA of claim 1, wherein said at least one permanent magnet comprises a plurality of permanent magnets.

4. The rotary vane MREA of claim 1, wherein said at least one permanent magnet comprises a circular permanent magnet.

5. The rotary vane MREA of claim 4, wherein said circular permanent magnet is embedded in said stator body.

6. The rotary vane MREA of claim 5, wherein said circular permanent magnet is seated inside an annular notch circumscribing said stator body.

7. The rotary vane MREA of claim 5, wherein said electromagnetic coils wound about said stator body are wound inside said annular notch adjacent circular permanent magnet.

8. The rotary vane MREA of claim 2, wherein said damping characteristic comprises stroking load, and said controller selectively increases said stroking load for shock absorption and selectively decreases said stroking load for vibration absorption.

9. The rotary vane MREA of claim 8, wherein said at least one permanent magnet maintains a minimum stroking load for failsafe operation when no current is supplied to said electromagnetic coils.

10. A magnetorheological energy absorber (MREA), comprising:
    a housing defining a sealed interior;
    magnetorheological fluid within the interior of said housing;
    a rotor mounted on a shaft inside said housing in exposure to said magnetorheological fluid;
    a stator body mounted stationary relative to said housing;
    at least one switchable magnet attached to said stator body for generating a baseline magnetic field in said magnetorheological fluid;
    electromagnetic coils wound about said stator body for generating an offset magnetic field in said magnetorheological fluid;

a damping characteristic of the magnetorheological fluid on said rotor comprising a function of said constant baseline, electromagnetic field and said variable offset electromagnetic field.

11. The rotary vane MREA of claim 10, further comprising a control system including non-transitory computer memory, and a programmable controller programmed with control software comprising computer instructions stored on the non-transitory computer memory for adjusting current in said electromagnetic, coils to selectively increase or decrease said offset magnetic field.

12. The rotary vane MREA of claim 10, wherein said at least one switchable permanent magnet comprises a plurality of switchable permanent magnets.

13. The rotary vane MREA of claim 12, wherein said electromagnetic coils wound about said stator body are wound inside said annular notch adjacent circular permanent magnet.

14. The rotary vane MREA of claim 11, wherein said damping characteristic comprises stroking load, and said controller selectively increases said stroking load for shock absorption and selectively decreases said stroking load for vibration absorption.

15. The rotary vane MREA of claim 14, wherein said at least one permanent magnet maintains a minimum stroking load for failsafe operation when no current is supplied to said electromagnetic coils.

16. A magnetorheological energy absorber (MREA), comprising:
a housing defining a sealed interior;
magnetorheological fluid within the interior of said housing;
a piston body mounted inside said housing in exposure to said magnetorheological fluid;
at least one switchable permanent magnet attached to said piston body for generating a baseline magnetic field in said magnetorheological fluid;
electromagnetic coils wound about said piston body for generating an offset magnetic field in said magnetorheological fluid;
a damping characteristic of the magnetorheological fluid on said piston body comprising a function of said constant baseline electromagnetic field and said variable offset electromagnetic field.

17. The MREA of claim 16, further comprising a control system including non-transitory computer memory, and a programmable controller programmed with control software comprising computer instructions stored on the non-transitory computer memory for adjusting current in said electromagnetic coils to selectively increase or decrease said offset magnetic field.

18. The MREA of claim 16, wherein said at least one permanent magnet comprises a plurality of circular permanent magnets.

19. The MREA of claim 16, wherein said damping characteristic comprises stroking load, and said controller selectively increases said stroking load for shock absorption and selectively decreases said stroking load for vibration absorption.

20. The MREA of claim 19, wherein said at least one permanent magnet maintains a minimum stroking load for failsafe operation when no current is supplied to said electromagnetic coils.

21. A magnetorheological seat suspension, comprising:
a frame for supporting a passenger seat;
a passenger seat having a yoke attached thereto, said passenger seat being movably mounted to said frame by said yoke;
at least one rotary magnetorheological energy absorber (MREA) mounted on said frame, each said rotary MREA including a housing defining a sealed interior, magnetorheological fluid in the interior of said housing, a rotor mounted on a shaft inside said housing in exposure to said magnetorheological fluid, said shaft extending outside said housing;
at least one spring connected to said yoke; and
at least one suspension cable connected at one end to said at least one spring and and spooled at another end about the shaft of said MREA for translating linear motion of the passenger seat along said frame into rotation of said MREA rotor.

22. The magnetorheological seat suspension according to claim 21, wherein said at least one MREA comprises a pair of MREAs mounted on said frame, said at least one spring comprises a pair of springs mounted on said frame, and said at least one suspension cable comprises a pair of suspension cables each running between a corresponding spring and said passenger seat or yoke.

23. The magnetorheological seat suspension according to claim 21, wherein said MREA is a rotary vane MREA further comprising,
a housing defining a sealed interior;
magnetorheological fluid in the interior of said housing;
a rotor mounted on a shaft inside said housing in exposure to said magnetorheological fluid;
a stator body mounted stationary relative to said housing;
at least one permanent magnet attached to said stator body for generating a constant baseline magnetic field in said magnetorheological fluid;
electromagnetic coils wound about said stator body for generating an offset magnetic field in said magnetorheological fluid;
a damping characteristic of the magnetorheological fluid on said rotor comprising a function of said constant baseline electromagnetic field and said variable offset electromagnetic field.

24. The magnetorheological seat suspension according to claim 21, wherein said MREA is a rotary vane MREA further comprising,
a housing defining a sealed interior;
magnetorheological fluid within the interior of said housing;
a rotor mounted on a shaft inside said housing in exposure to said magnetorheological fluid;
a stator body mounted stationary relative to said housing;
at least one switchable magnet attached to said stator body for generating a baseline magnetic field in said magnetorheological fluid;
electromagnetic coils wound about said stator body for generating an offset magnetic field in said magnetorheological fluid;
a damping characteristic of the magnetorheological fluid on said rotor comprising a function of said constant baseline electromagnetic field and said variable offset electromagnetic field.

* * * * *